United States Patent [19]

Johnson

[11] Patent Number: 5,153,826
[45] Date of Patent: Oct. 6, 1992

[54] SPORTS STATISTICS CALCULATOR

[76] Inventor: Robert Johnson, 210 Southland Station Dr. #32, Warner Robins, Ga. 31088

[21] Appl. No.: 442,315

[22] Filed: Nov. 28, 1989

[51] Int. Cl.$^5$ ............... G06F 15/28; G06F 15/44; G06G 7/48
[52] U.S. Cl. ............... 364/410; 377/5; 273/148 R
[58] Field of Search ............... 364/411, 410, 700; 340/323 R; 377/5; 273/88, 148 R

[56] References Cited

U.S. PATENT DOCUMENTS

| | | | |
|---|---|---|---|
| 4,128,893 | 12/1978 | Johnson | 364/411 |
| 4,220,992 | 9/1980 | Blood | 364/410 |
| 4,266,214 | 5/1981 | Peters, Jr. | 377/5 |
| 4,286,323 | 8/1981 | Meday | 377/5 |
| 4,367,526 | 1/1983 | McGeary | 377/5 |
| 4,654,818 | 3/1987 | Wetteran | 395/500 |
| 4,689,757 | 8/1987 | Downing | 364/550 |
| 4,868,772 | 9/1989 | Collard | 364/411 |
| 4,879,651 | 11/1989 | Little, Jr. | 364/410 |
| 4,990,603 | 3/1991 | Mele et al. | 364/410 |

Primary Examiner—Roy N. Envall, Jr.
Assistant Examiner—Laura Brutman
Attorney, Agent, or Firm—Shlesinger, Arkwright & Garvey

[57] ABSTRACT

A hand-held, portable device for keeping track of the in-play and error shots of a specific type of shot made by a player in a sports event, comprises at least a first display for indicating at least the percentage of the cumulative number of in-play shots relative to the cumulative number of the total in-play and error shots; a first key switch for inputting each in-play shot; a second key switch for inputting each error shot; and a microprocessor for keeping track of the total number of in-play and error shots and for calculating at least the percentage of the cumulative number of the in-play shots relative to the cumulative number of the shots made by the player, whereby the percentage display is updated each time one of the first and second key switches is depressed.

20 Claims, 6 Drawing Sheets

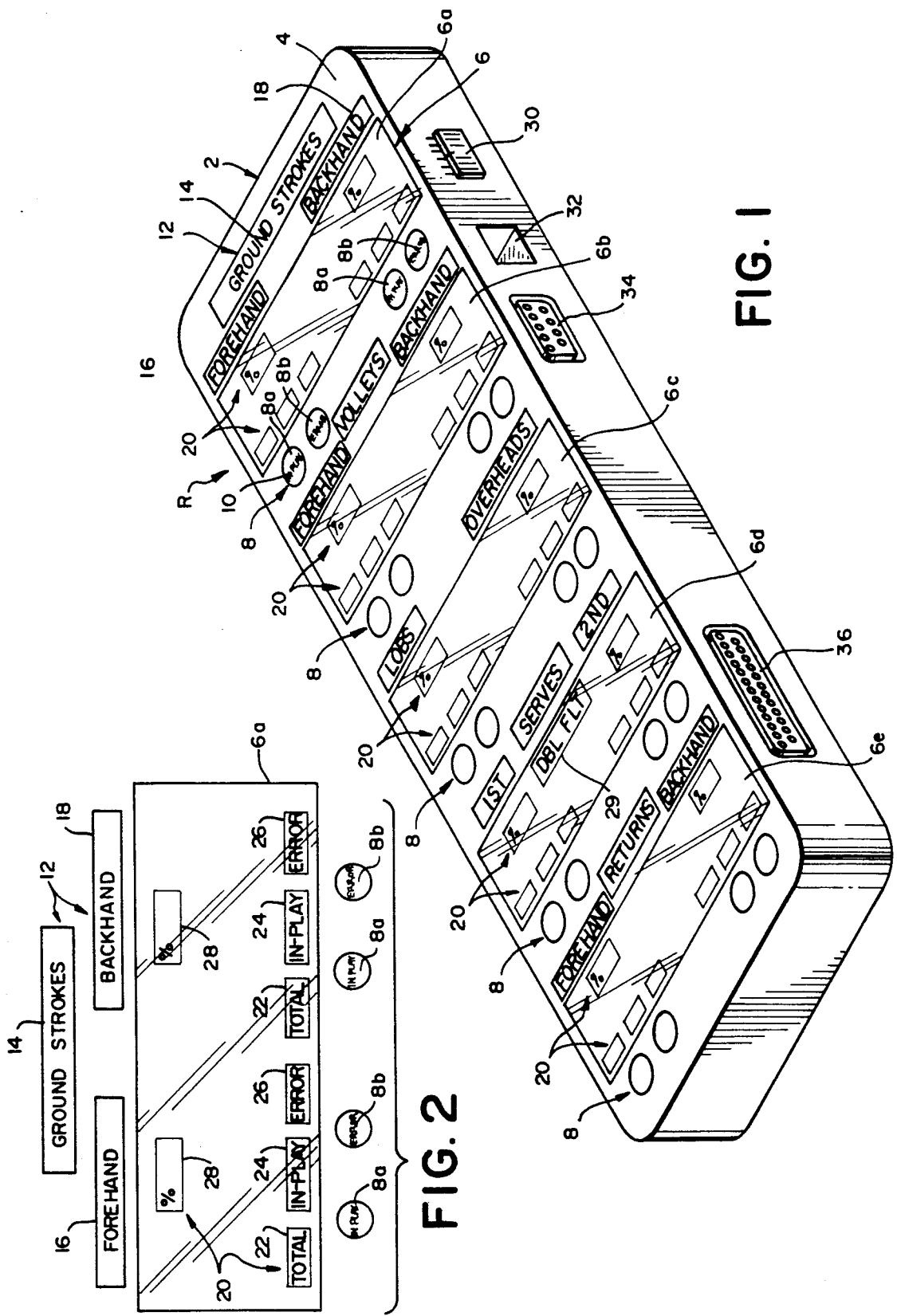

SPORTS STATISTICS CALCULATOR

FIELD OF THE INVENTION

The present invention relates to an electronic portable, hand-held programmable device for use in accumulating data and providing scoring information for a game of tennis or for other various types of sports.

BACKGROUND OF THE INVENTION

In a game of sport, such as tennis, softball, baseball, volleyball, golf or boxing, etc., it is often desirable to analyze the performance of a player in order that the future performance of the player may be improved. A way of analyzing the performance of the player is by keeping track of each type of shot, hit or action that is made, including in-play and error shots. A percentage figure relative to the cumulative number of in-play shots versus the total number of shots for each type of shot is calculated. In this manner, one can determine where most of the errors are being committed, thereby showing where improvements have to be made. For example, in a game of tennis, each type of shot may be categorized as a ground stroke, either forehand or backhand, a volley, either a forehand or a backhand, a lob, and overhead, a serve, and a return, either a forehand or a backhand. By keeping track of in-play and error shots for each type of category of shots, one is presented with data pointing out where the strong points and weak points of the player lie.

Several prior art devices are available which analyze the performance of a player in an athletic event. However, such devices are cumbersome to use, which probably leads to errors in accumulating the pertinent statistics.

OBJECTS AND SUMMARY OF THE INVENTION

It is therefore an object of the present invention to provide a device for gathering performance statistics of a player during the progress of an athletic event, which device is convenient to use.

It is another object of the present invention to provide a device which provides an immediate readout of the performance statistics pertaining to each type of shots that a player makes in the particular athletic event.

It is yet another object of the present invention to provide a device which is hand-held and portable, thereby making it convenient to use.

It is still another object of the present invention to provide a device which can be connected to a personal computer for transfer of data therebetween.

It is a further object of the present invention to provide a device for keeping track of each type of shot which a player makes, be it in-play or error, to thereby arrive at the percentage figure of the number of shots in a particular category made by him which are in-play or error.

It is another object of the present invention to provide a device which provides the percentage of the total number of shots made by the player relative to his in-play shot, which percentage figure is updated each time a shot is made.

In summary, the present invention provides a portable, hand-held device for keeping track of the statistics of a player during the progress of an athletic event.

BRIEF DESCRIPTION OF THE DRAWINGS

FIG. 1 is a perspective view of the present invention.

FIG. 2 is a detailed front view of one display used in the present invention.

DETAILED DESCRIPTION OF THE INVENTION

FIGS. 1 and 2

Figure 3:
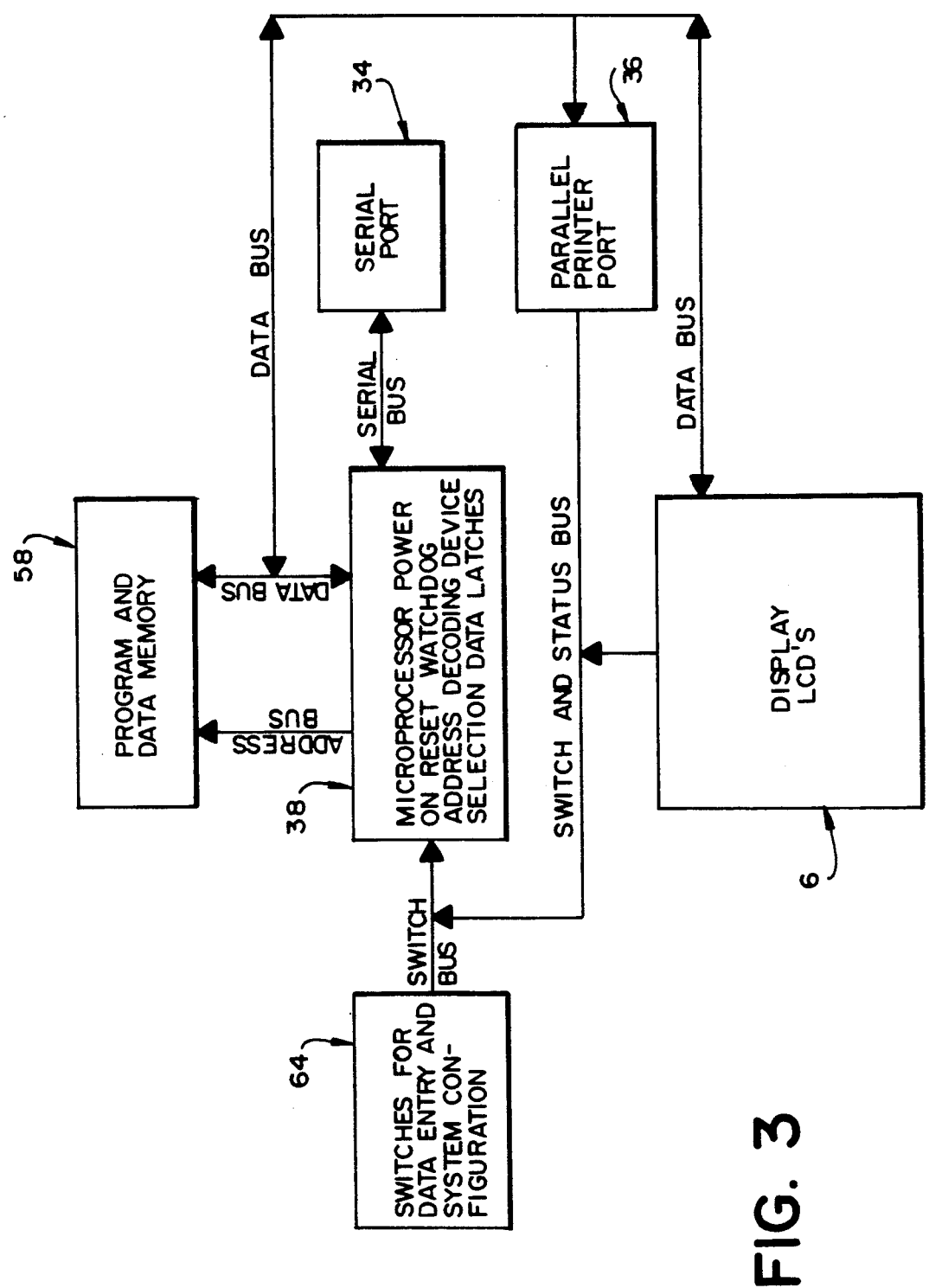
FIG. 3 is an elementary functional block diagram of a circuit used in the present invention.

A portable, hand-held electronic sports statistics calculator R is disclosed in FIG. 1. The calculator R is preferably battery operated for gathering and tracking the statistics relative to the performance of a player in an athletic event. The calculator R will be described in detail below for use with the game of tennis. However, it should be understood by a person skilled in the art that the calculator R can easily be modified to work with other sports, such as softball, baseball, volleyball, golf, basketball, boxing, etc.

The calculator R includes a housing 2 which is designed to be conveniently handled within a person's hand so that it can be conveniently used during the progress of a game. The housing 2 includes a relatively flat front face 4. On the front face 4 is a plurality of displays 6, individually designated as 6a, 6b, 6c, 6d and 6e, preferably of the LCD type, having two lines capable of displaying forty characters per line, as best shown in FIG. 1. The displays 6 are preferably arrayed vertically along the front face 4. Depending on the specific sport, the calculator R of FIG. 1 can have from one to six displays 6, although the number of displays may vary depending on the play of game to be recorded. A set of key switches 8 is associated with each of the displays 6, as best shown in FIG. 1. Although four key switches are shown for each display 6, a lesser or greater number may be used depending on the particular application. Each set of key switches 8 is arranged into groups, each group having keys 8a and 8b. Key 8a is used to enter an in-play shot made by the player, while key 8b is used to enter an error shot. Preferably, keys 8a and 8b include indicia 10 to indicate which key is used to enter the appropriate data. The indicia 10 may also be affixed to the front face 4 of the housing 2 or written to the displays 6 in the immediate vicinity of the respective keys 8a and 8b.

Each display 6 includes a group of indicia 12 to indicate the type of shot which is displayed in the associated display 6. For example, as best shown in FIG. 2, the display 6a includes indicia 14 which informs the user that display 6a is dedicated for GROUND STROKES. Also, indicia 16 and 18 indicate that the left hand portion of the display 6a indicates information on FOREHAND shots and the right hand portion of display 6a indicates information on BACKHAND shots.

Each display 6 further includes another group of indicia 20 to provide the proper units to the figures which are written on the displays 6. Indicia 22, 24, 26 and 28 provide the proper labels for the figures appearing adjacent to each of the respective indicia. For example, indicia 22 indicates that the number appearing adjacent thereto in the display 6 is the total number of shots for a forehand groundstroke; indicia 24 is for the total number of in-play shots for a forehand groundstroke; indicia 26 is for the total number of error shots for a forehand groundstroke; and indicia 28 is for the percentage of the total forehand groundstrokes which are in-play, as best shown in FIG. 2. The groups of indicia 20 are identical on the left hand side of each display 6 as on the right hand side. The display 6e includes an additional indicia 29 for the cumulative number of double faults in serves shots. The groups of indicia 20 can be within, on or outside the displays 6, as long as they are adjacent to their respective figures which are written on the displays.

An on-off switch 30 turns the main power on and off to the calculator R. The calculator R is preferably battery powered. A connection plug 32 permits the calculator R to be connected to an external source in case the battery within the calculator R is discharged. A serial port 34 is provided to permit transfer of data between the calculator R and an external personal computer, such as an IBM (registered trademark) PC or compatible. A parallel port 36 is provided for output of data from the calculator R to a printer 84 (shown schematically in FIG. 4) for providing a hard copy of the data contained within the calculator R.

A person skilled in the art should understand that the specific external features of the calculator R as depicted in FIGS. 1 and 2 may be rearranged to arrive at a different configuration without the detracting from the present invention.

Figure 4:
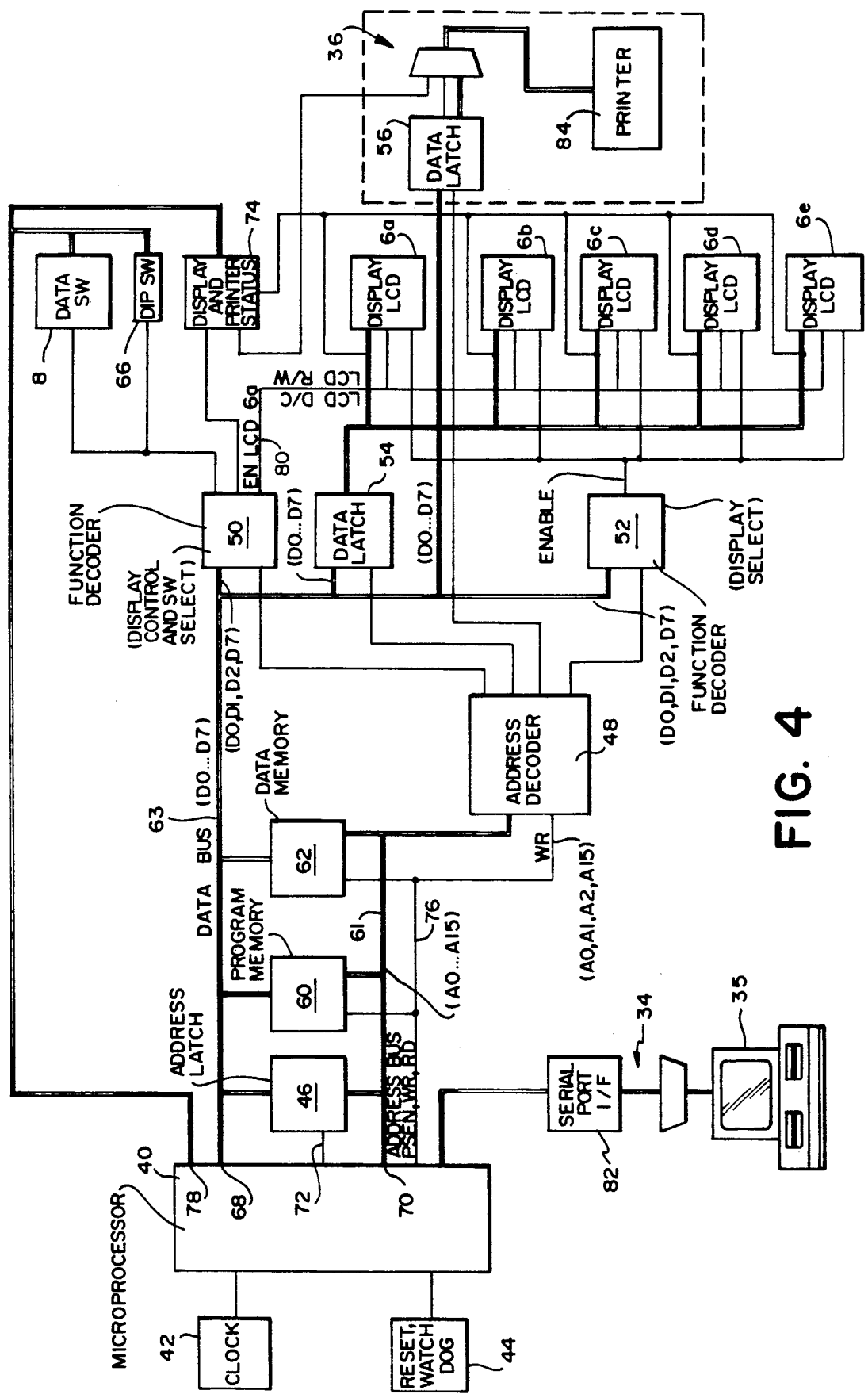
FIG. 4 is an expanded functional black diagram of FIG. 3.

FIGS. 3 and 4

A functional block diagram of the circuitry used in the calculator R is disclosed in FIG. 3. A controller 38 is the central controller of the calculator R. The controller 38 includes a microprocessor 40, a clock 42, a power reset and watchdog timer 44, an address demultiplexer 46, address decoder 48, function decoders 50 and 52, and data latches 54 and 56, as best shown in FIG. 4. Memory 58 provides program memory 60 and data memory 62 for the controller 38. An address bus 61 and a data bus 63 interconnect the memory 58 with the controller 38 and its associated components.

The function decoder 50 provides display control and switch select. The function decoder 52 provides display select. The data latch 54 provides latched data for writing to the displays 6. The data latch 56 provides latched data to the printer 84.

A switch block 64 provides data entry and system configuration for the calculator R. The switch block 64 includes the key switches 8, as best shown in FIG. 1, and dip switches 66, as best shown in FIG. 4. Display 6 provides a means to prompt the user for data entry, displays the data and calculation results and indicates the status information relative to the serial port 34, the parallel port 36 and the displays 6. The serial port 34 allows connectivity with a personal computer 35 for interchange of data, as best shown in FIG. 4. The parallel port 36 allows connectivity to the printer 84 to permit the user to obtain a hard copy of the data and calculation results within the calculator R.

The data bus 63 interconnects the controller 38 with the serial port 34, the parallel port 36 and the displays 6.

MICROPROCESSOR

The microprocessor 40 operates according to a set of instructions stored in the program memory 60. The microprocessor 40 uses the key switches 8, dip switches 66 and the displays 6 to accept data concerning the scoring of the game being played. This data is stored in data memory 62 and used to calculate and display information relevant to the scoring of the game.

When power is first applied to an electronic circuit, there is a short finite time during which the applied voltage increases from zero to its final operating value. Since most integrated circuits operate correctly only within a small range of voltages around a rated operating voltage, it is very important that the microprocessor and other circuits not be allowed to operate during this time. The power reset function in the circuit block 44 detects that the applied voltage is not within the allowed range and sends a signal to the microprocessor 40 which keeps the circuits in a reset state. The signal is not asserted when the voltage reaches a steady state within the selected operating voltage range. The signal also has the effect of insuring that the circuits begin operation in a known state every time that power is applied. The reset function also operates as a low voltage detector; if the applied voltage drops below the lower limit of the operating voltage range the reset signal is asserted.

The watchdog timer function of circuit block 44 is used to guard against the executing program getting stuck in an infinite loop or other non-operating state. The watchdog timer function requires that the microprocessor 40 output a pulse within a specified time period, preferably selected to be 1.2 seconds. If the microprocessor 40 outputs a pulse within 1.2 seconds of the last pulse output, then all is well and the watchdog timer is reset and begins counting another 1.2 second period. If the pulse is not output within 1.2 seconds of the last pulse, the reset signal from the power reset function of circuit block 44 is asserted. This reset signal forces the microprocessor 40 to begin operating as if power had just been applied.

The address demultiplexer 46 advantageously permits the reduction of the number of pins on the microprocessor 40. The microprocessor 40 uses an eight-bit data (D0..D7) which is output through pin 68, and uses a sixteen-bit address (A0..A15) which is output through pins 68 and 70 in eight bit segments. The microprocessor 40 places the lower eight address bits (A0..A7) and the data bus 63 bits onto the same eight pins 68. The address demultiplexer 46 is an octal latch used to demultiplex this address-data bus. An address latch enable signal at line 72 provides the latching of the lower eight address bits into address demultiplexer 46. The output of circuit block 46 is combined with the upper address bits (A8..A15) output at the eight bit pins 70 and output by the microprocessor 40 to form the address bus 61. The address bits is used to select the memory location or physical device to be accessed by the microprocessor 40.

Every device that the microprocessor 40 accesses has been assigned a unique address. This address is output by the microprocessor 40 on the address bus 61, as best shown in FIG. 4. Address decoder 48 is used to decode the address bus 61 and generate an enable signal to the selected device.

In order to reduce the number of integrated circuits required, the full address of every device is not decoded. The following memory map describes the device decoding scheme preferably used by the present invention.

|  | Address Bits | | | | |
| --- | --- | --- | --- | --- | --- |
| Device | 15 | 14 to 3 | 2 | 1 | 0 |
| Data Memory 62 | 0 | Don't Care | X | X | X |
| Data Latch 54 | 1 | Don't Care | X | X | X |
| Function Decoder 50 | 1 | Don't Care | X | X | X |
| Function Decoder 52 | 1 | Don't Care | 0 | 1 | 0 |
| Data Latch 56 | 1 | Don't Care | 0 | 1 | 1 |
| PRN Set Strobe | 1 | Don't Care | 1 | 0 | 0 |
| PRN Reset Strobe | 1 | Don't Care | 1 | 0 | 1 |
| Not Assigned | 1 | Don't Care | 1 | 1 | 0 |
| Not Assigned | 1 | Don't Care | 1 | 1 | 1 |

A second level of decoding is present when writing to the function decoder 50. The eight data bits written are used to select one out of eight lines and either set or clear the selected line. Data bits D0, D1 and D2 are used to select the line, while data bit D7 is set to the state that the line is to be changed to.

The selected line will remain in this state until changed by the microprocessor 40. The following memory map details the decoding of these bits.

|  | Data Bits | | |
| --- | --- | --- | --- |
| Line | 2 | 1 | 0 |
| Select SW 0-7 | 0 | 0 | 0 |
| Select SW 8-15 | 0 | 0 | 1 |
| Select SW 16-23 | 0 | 1 | 0 |
| Select Dip SW | 0 | 1 | 1 |
| Select Status Port | 1 | 0 | 0 |
| Disp/Ctrl LCD | 1 | 0 | 1 |
| RD/WR LCD | 1 | 1 | 0 |
| Select Display 6a | 1 | 1 | 1 |

LATCHING OF DATA

Data is written to the microprocessor controlled devices via the microprocessor data bus 63. The bus 63 is shared among all of the devices as well as the program memory 60 and data memory 62. Data written to a device is only present on the bus for a short period of time. Each selected device must take the data from the bus at the appropriate time and hold the data while it is being used. This process is known as latching the data.

The decoded address signals described in the above are used to select the device which is to latch the data and provide the signal that indicates when the data on the bus is valid.

The function decoder 50 provides the data latch to LCD control and switch select. Data latch 54 provides data to the displays 6. Data latch 56 provides data to the printer 84. The function decoder 52 provides display select. The data latch 74 provides display and printer status.

MEMORY

The program memory 60 and the data memory 62 are controlled by the microprocessor 40 through the data bus 63 and the address bus 61. The microprocessor 40 selects the memory location through an address which is output from the microprocessor 40 over the address bus 61. Data is transferred between the microprocessor 40 and the selected memory over the data bus 63. The program memory 60 is used to hold the sequence of instructions that the microprocessor 40 follows to perform useful work. In the present invention, the instructions are preferably held in an EPROM integrated circuit. The program memory 60 advantageously retains its data even when power is turned off. The microprocessor 40 may only read the contents of the program memory 60.

The microprocessor 40 indicates that it wants to read an instruction from the program memory 60 by outputting the appropriate address on the address bus 61 and asserting its PSEN signal through line 76, shown in FIG. 4 schematically as a single line. The program memory 60 places the contents of the selected memory location on the data bus 63 where the microprocessor 40 expects to find valid information when it removes its PSEN signal.

Data memory 62 is used to hold the data entered by the user during the course of the sport event. Following the program stored in the program memory 60, the microprocessor 40 will accept user inputs from the key switches 8 and place this data into the data memory 62. Preferably, the data memory 62 is a RAM integrated circuit and includes an internal battery, thereby retaining its data even when the switch 30 is turned off but allows the data to be entered, read and changed by the microprocessor 40 when power is turned back on. Use of a battery backed-up data memory 62 insures that the data will be valid after power has been turned on and off.

The microprocessor 40 indicates that it wants to read one byte of data from the data memory 62 by outputting the appropriate address on the address bus 61 and asserting its RD signal through line 76. The data memory 62 places the contents of the selected memory location on the data bus 63 where the microprocessor 40 expects to find valid information when it removes its RD signal.

Similarly, the microprocessor 40 indicates that it wants to write a byte of data to the data memory 62 by outputting the appropriate address on the address bus 61 and asserting its WR signal. The microprocessor 40 places data on the data bus 63 where the data memory 62 expects to find valid information when its WR signal is removed.

The program stored in the program memory 60 uses the data in the data memory 62 to perform the scoring calculations. A copy of the information displayed on the displays 6 is also kept in the data memory 62, as are the results of intermediate calculations. All of this information is available to the microprocessor 40 so that it can continue scoring after power has been cycled, an event that can occur often in a portable device.

SWITCHES

The key switches 8 can include a set of up to 24 push buttons which are used by the operator to enter data. The key switches 8 are programmable so that the data they represent may be changed on a program by program basis.

Data from each of the key switches 8 is entered into the program when the microprocessor 40 reads the switch bus through its port 78. The program executing within the microprocessor 40 will read the switches 8, eight at a time, on a preordered basis. A logical one represents an unpressed switch and a logical 0 represents a pressed switch. Since mechanical switches bounce when pressed and released, the program in the microprocessor 40 will perform a debounce operation on each key switches 8.

The dip switches 66 include eight individual switches. The dip switches 66 are read by the microprocessor 40 during the initialization portion of the program. A logical 1 represents an open switch and a logical 0 represents a closed switch. The following is a preferable assignment of the dip switches 66.

| Switch | Meaning When Switched On |
| --- | --- |
| 1 | Battery Ram Available |
| 2 | Printer Available |
| 3 | Clock Available |
| 4 | Enable Diagnostics |
| 5 | Display 6b Installed |
| 6 | Display 6c Installed |
| 7 | Display 6d Installed |
| 8 | Display 6e Installed |

DISPLAYS

The calculator R as shown in FIG. 1 can accommodate up to five LCD displays 6. The displays 6 are used to prompt the user for data entry and display scores and status information. The display 6a must always be present while displays 6b through 6e are optional. The presence of each of the displays 6 is indicated to the microprocessor 40 by setting a switch on the dip switches 66, as described in the above. Although the present invention preferably utilizes a two line by forty character displays, it should be understood to a person skilled in the art that different size displays may be used.

Characters are written to the displays 6 in the following manner. The microprocessor 40 writes to the function decoder 50 to indicate if the operation is to be a read or a write operation. The function decoder 50 asserts a LCD R/W signal through a line 80, where 0 means a write operation and 1 means a read operation. The microprocessor 40 again writes to the function decoder 50 to indicate if the data transfer is to be a control or data. The function decoder 50 asserts its LCD D/C signal, where 0 means control and 1 means data. The microprocessor 40 then selects which display is to be accessed by writing to function decoder 50 to select display 6a or to function decoder 52 to select displays 6b, 6c, 6d or 6e. The microprocessor 40 writes the data or control information to the data latch 54. The microprocessor 40 then clears the LCD R/W bit which causes the data/control bits to be written into the selected display and clears the enable line of that display. The intensity of each of the display 6 can be adjusted via a potentiometer (not shown).

If the display 6b through 6e are not used, the function decoder 52 may be omitted.

SERIAL PORT

The calculator R can access an external device, such as a modem (not shown) or the personal computer 35 through the serial port 34, which is preferably an EIA RS232 serial port. The serial port 34 includes a DB9 connector whose pin out matches that of a RS232 connector used in the IBM (registered trademark) PC family.

The microprocessor 40 includes the circuitry for generating a baud clock and the transmit and receive UART functions. An interface circuitry 82 is used to convert the microprocessor TTL level signals into the voltage levels required for the RS232-C operation.

Figure 6:
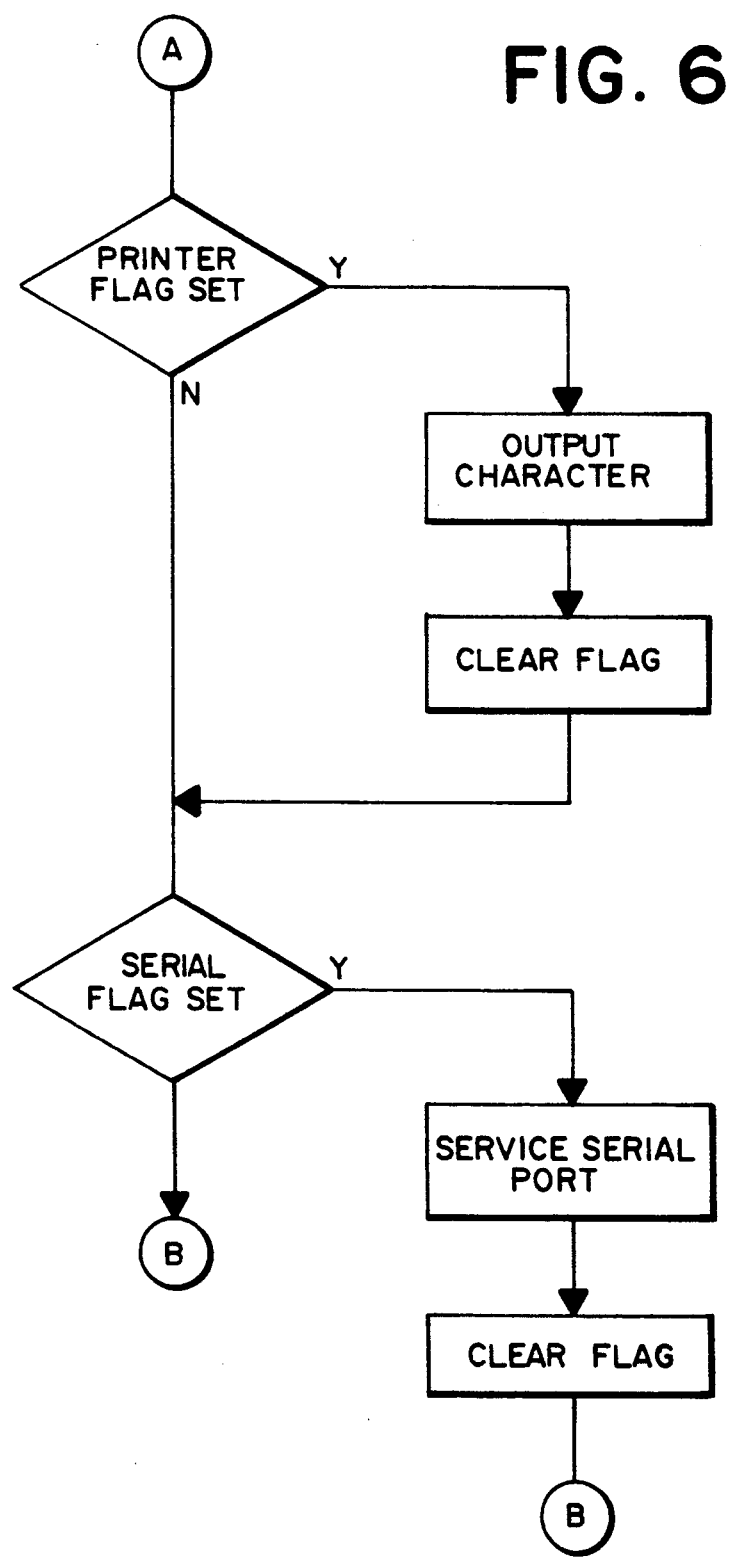
Figure 7:
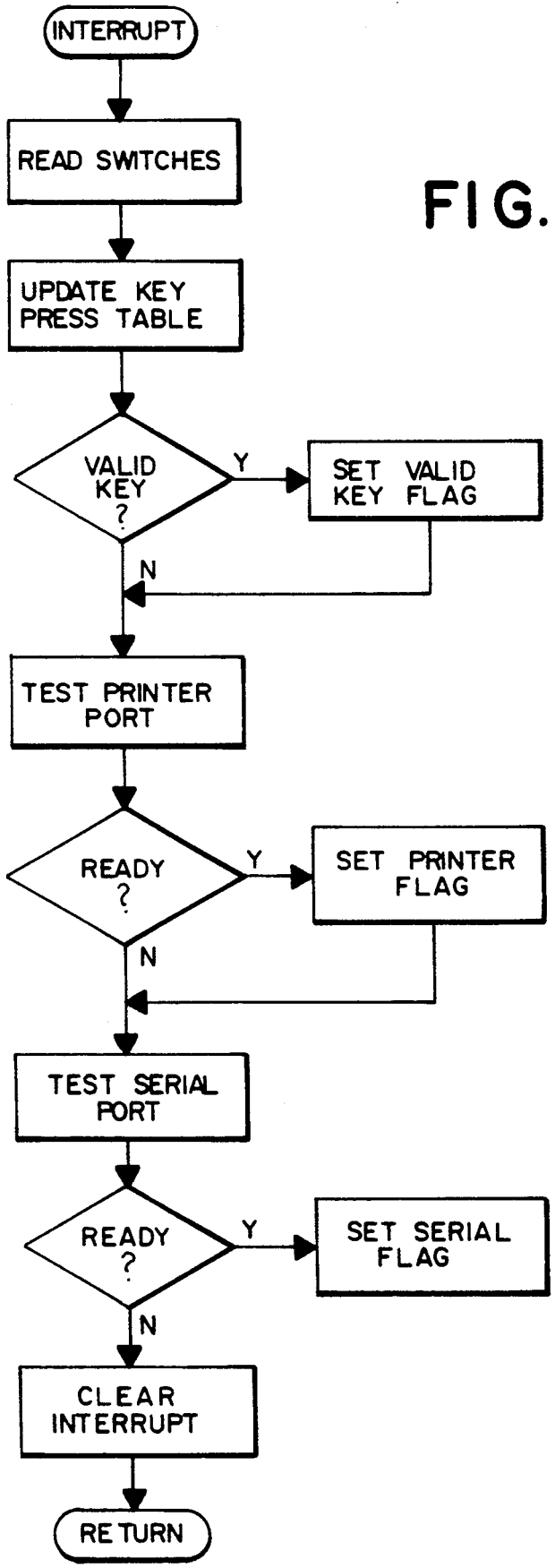

The program executing within the microprocessor 40 controls the operation of the serial port 34, as best shown in FIGS. 6 and 7. The program may send and/or receive data and the calculation from the data.

PARALLEL PORT

The parallel port 36 allows the calculator R to be hooked up to a printer 84 which is equipped with a Centronics parallel interface. The format and contents of the data sent to the printer 84 are dependent upon the specific sport being played.

OPERATION

The user turns on the calculator R by means of the switch 30. This operation initializes the calculator R of FIG. 1. The calculator R is now ready to accept data from the user. Data is entered by pressing any of the key switches 8, depending on the particular shots to be recorded. A counter in the data memory 62 is associated with each of the key switches 8. Each time a key switch is pressed, the counter associated with that key switch is incremented by 1. The displays 6 are then updated with the counter contents and the calculation results performed by the microprocessor 40. The calculation results includes the total of the in-play and error shots and the percentage of the total shots in respect to the in-play shots. For the display 6d associated with serves shots, an extra counter is provided to count the number of double faults. The user is, therefore, always presented with an up-to-date set of data and calculation results relative to the ongoing athletic event. The gathered data can be further analyzed in greater detail when the calculator R is connected to the personal computer 35 where data from several tournaments or events may be accumulated over time.

Figure 5:
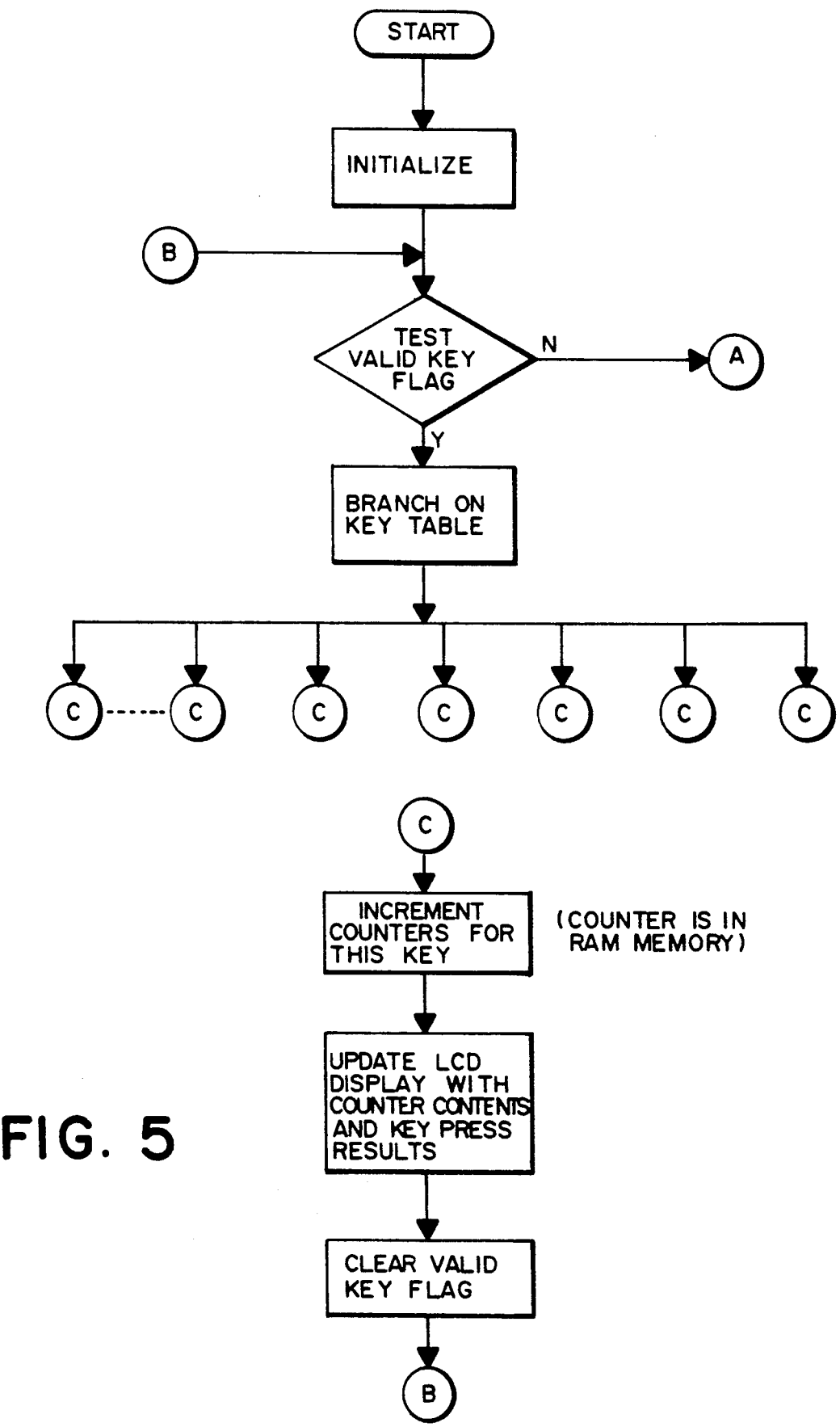
FIGS. 5-7 are elementary program flow charts used in the present invention.

The software program used in the present invention is depicted in elementary flow chart diagrams as best shown in FIGS. 5, 6 and 7. The interrupt routine depicted in the flow chart of FIG. 7 is activated when the program is initialized and continues to run while the calculator R is being used.

While this invention has been described as having preferred design, it is understood that it is capable of further modification, uses and/or adaptions of the invention following in general the principle of the invention and including such departures from the present disclosure as come within known or customary practice in the art to which the invention pertains, and as may be applied to the essential features set forth, and fall within the scope of the invention or the limits of the appended claims.

I claim:

1. A hand-held, portable device for keeping track of in-play and error shots of a specific type of shot made by a player in a sports event, said device comprising:
    a) display means for indicating a performance indicator based on the cumulative number of in-play shots relative to the cumulative number of the total in-play and error shots;
    b) a dedicated first key switch for inputting each in-play shot such that said first key switch is depressed whenever an in-play shot is made;
    c) a dedication second key switch for inputting each error shot such that said second key switch is depressed whenever an error shot is made; and
    d) a programmable microprocessor means operably connected to said display means and said first and second switches for automatically keeping track of the total number of in-play and error shots and for automatically calculating the performance indicator based on the cumulative number of the in-play shots relative to the cumulative number of the total shots made by the player, and for automatically updating said display means each time said of one said first and second key switches is depressed.

2. A device as in claim 1, wherein:
a) said display means includes means for displaying the cumulative number of the in-play and error shots and the cumulative number of the sum of the in-play and error shots.

3. A device as in claim 2, wherein:
a) said display means includes a first indicia associated with the cumulative number of the in-play shots, a second indicia associated with the cumulative number of the error shots, a third indicia associated with the cumulative number of all the shots, and a fourth indicia associated with the performance indicator.

4. A device as in claim 1, wherein:
a) said microprocessor means includes memory means for storing data and program steps.

5. A device as in claim 1, and further comprising:
a) means for connecting the device to a computer for transferring data therebetween.

6. A hand-held, portable electronic device for keeping track of in-play and error shots of specific types of shots made by a player in a sports event, said device comprising:
a) a plurality of counters;
b) a plurality of dedicated key switches each of which is associated with one of said plurality of counters, said plurality of dedicated switches being grouped into pairs of switches, each pair being associated with in-play and error shots respectively and a type of shot;
c) a programmable microprocessor for controlling the operation of said counters and said key switches such that each of said key switches increments its associated counter each time each of said key switches is depressed and for automatically calculating and updating a performance indicator based on the contents of said counters each time one of said key switches is depressed; and
d) display means operably connected to said microprocessor for automatically displaying the contents of each of said counters and the calculated performance indicator each time said one of said key switches is depressed.

7. A device as in claim 6, wherein:
a) said display means includes indicia.

8. A device as in claim 6, and further comprising:
a) means for connecting the device to a computer for transferring data therebetween.

9. A device as in claim 6, and further comprising:
a) means for printing the contents of said counters and the calculation results.

10. A device as in claim 6, wherein:
a) said microprocessor includes random access memory; and
b) said plurality of counters are associated with said random access memory.

11. A hand-held, portable electronic device for keeping track for each type of shot the in-play and error shots made by a player in a sports event, said device comprising:

a) a plurality of display means for indicating for each type of shot the cumulative number of in-play and error shots and the percentage of the cumulative number of in-play shots relative to the cumulative number of the in-play and error shots;
b) at least first and second dedicated key switches operably associated with each of said plurality of display means for entering into the device for each type of shot the in-play and the error shots, respectively, made by the player such that respective first and second keys are depressed each time in-play and error shots are made; and
c) a programmable microprocessor means for keeping track of each type of shot the cumulative number of in-play and error shots and for automatically calculating the percentage of the cumulative number of in-play shots relative to the cumulative number of in-play and error shots made by the player, and for automatically updating in said plurality of display means the cumulative number of in-play and error shots and the percentage each time one of said at least first and second key switches is depressed.

12. A device as in claim 11, wherein:
a) said connecting means is a serial port.

13. A device as in claim 11, and further comprising:
a) a printer operably connected to the device.

14. A device as in claim 13, wherein:
a) the device includes a parallel port for connecting to said printer.

15. A device as in claim 11, and further comprising:
a) means for connecting the device to a computer for transfer of data therebetween.

16. A method for keeping track of in-play and error shots of specific types of shots made by a player in a sports event, said method comprising the steps of:
a) providing an in-play counter and an error counter for each type of shot made by the player;
b) providing a dedicated key switch for each counter;
c) pressing the respective key switch whenever a shot is made;
d) automatically incrementing the respective counter each time its key switch is pressed;
e) storing the contents of each counter;
f) calculating a performance indicator based on the contents of each counter;
g) displaying the calculated performance indicator; and
h) updating the calculated performance indicator each time a key switch is pressed.

17. A method as in claim 16, wherein:
a) the step of calculating a performance indicator includes calculating the ratio of the in-play shots to the total number of shots.

18. A method as in claim 16, and including the step of:
a) transferring the contents of the counters to a computer for analysis.

19. A method as in claim 16, and including the step of:
a) printing the contents of the counters and the displayed performance indicator.

20. A method as in claim 16, wherein:
a) said calculating is performed by a programmable microprocessor.

* * * * *